(12) United States Patent
Chang

(10) Patent No.: US 9,186,734 B2
(45) Date of Patent: Nov. 17, 2015

(54) HEIGHT ADJUSTMENT MECHANISM OF TABLE SAW

(71) Applicant: Chin-Chin Chang, Taichung (TW)

(72) Inventor: Chin-Chin Chang, Taichung (TW)

(*) Notice: Subject to any disclaimer, the term of this patent is extended or adjusted under 35 U.S.C. 154(b) by 169 days.

(21) Appl. No.: 14/055,001

(22) Filed: Oct. 16, 2013

(65) Prior Publication Data

US 2015/0101470 A1 Apr. 16, 2015

(51) Int. Cl.
*B23D 45/06* (2006.01)

(52) U.S. Cl.
CPC .............. *B23D 45/068* (2013.01); *B23D 45/06* (2013.01)

(58) Field of Classification Search
CPC .... B23D 45/068; B23D 45/06; B23D 45/062; B23D 45/063; B23D 45/067
See application file for complete search history.

(56) References Cited

U.S. PATENT DOCUMENTS

| | | | | |
|---|---|---|---|---|
| 4,516,612 | A * | 5/1985 | Wiley | 144/1.1 |
| 6,820,524 | B1 * | 11/2004 | Ceroll et al. | 83/13 |
| 2007/0079683 | A1 * | 4/2007 | Chen | 83/581 |
| 2007/0261527 | A1 * | 11/2007 | Wang | 83/477.1 |
| 2008/0196569 | A1 * | 8/2008 | Chuang | 83/477.1 |
| 2009/0314151 | A1 * | 12/2009 | Wang | 83/755 |
| 2010/0132527 | A1 * | 6/2010 | Liu et al. | 83/477.1 |
| 2011/0146470 | A1 * | 6/2011 | Lin | 83/477.1 |

* cited by examiner

Primary Examiner — Stephen Choi

(57) ABSTRACT

A height adjustment mechanism of a table saw is provided with a support including a concave seat, two first sleeves spaced from both ends of the seat respectively, a guiding hole, and two parallel brackets spaced from the guiding hole; a drive rod rotatably extended through the brackets; a first bevel gear mounted to an open end of the drive rod; first and second guide uprights fastened in the first sleeves respectively; a threaded guide rod inserted through the guiding hole; a second bevel gear at a bottom end of the guide rod to mesh with the first bevel gear; a motor including a threaded guide hole secured to the guide rod, two second sleeves with the first and second guide uprights sliding through respectively; and two support elements each including a concave base member, a sliding rail on the base member, and a fastening member.

6 Claims, 7 Drawing Sheets

HEIGHT ADJUSTMENT MECHANISM OF TABLE SAW

BACKGROUND OF THE INVENTION

1. Field of the Invention

The invention relates to table saws and more particularly to a table saw having a height adjustment mechanism with improved characteristics.

2. Description of Related Art

Table saws and circular saws are tools typically used by carpenters. For example, a worker may use a table saw to work on a wood plank to produce a board, block, or bar of desired size. In operation, the worker may adjust a cutting depth of a saw blade by lifting or lowering the saw blade relative to an upper cutting surface by turning a height adjustment mechanism. However, gaps among internal components may change due to loosening or other factors after a period of time of use. And in turn, it may adversely lower precision of the wood plank being cut by the saw blade after lowering or lifting. Further, it may horizontally move the saw blade to an undesired position, i.e., shifting. As a result, yield of the machined wood products is greatly decreased.

Table saws are well known in the art. For example, U.S. Pat. No. 6,820,524 discloses a table saw including a support plate having two guide openings for lifting or lowering a motor and a circular saw respectively. However, the support plate tends to permanently deform after a short time of use. Thus, the motor of the prior art table saw is typically a carbonic acid-based motor which is light in nature.

Notwithstanding the prior art, the invention is neither taught nor rendered obvious thereby.

SUMMARY OF THE INVENTION

It is therefore one object of the invention to provide a height adjustment mechanism of a table saw including a stand, an upper cutting surface mounted on the stand, a circular saw blade extending upward from the upper cutting surface, and a wheeled base mounted under the stand, comprising a support including a concave seat under the saw blade, two first sleeves spaced from both ends of the seat respectively, a guiding hole offset with respect to the seat and aligned with one first sleeve, and two parallel brackets spaced from the guiding hole; a drive rod rotatably extended through the brackets; a first bevel gear mounted to an open end of the drive rod; first and second guide uprights each having a lower portion fastened in one of the first sleeves; an externally threaded guide rod having a lower portion inserted through the guiding hole; a second bevel gear disposed at a bottom end of the guide rod to mesh with the first bevel gear; a motor including an internally threaded guide hole threadedly secured to the guide rod, two second sleeves with the first and second guide uprights slidably disposed through respectively; and two support elements each including a concave base member at one end, a curved sliding rail slidably disposed on the base member and secured to a bottom of the upper cutting surface, and a fastening member fastened on a top of the first guide upright or the second guide upright; wherein rotation of the drive rod rotates the guide rod to move both the motor and the saw blade upward or downward by sliding the second sleeves on the first and second guide uprights respectively.

The above and other objects, features and advantages of the invention will become apparent from the following detailed description taken with the accompanying drawings.

DETAILED DESCRIPTION OF THE INVENTION

Figure 1:
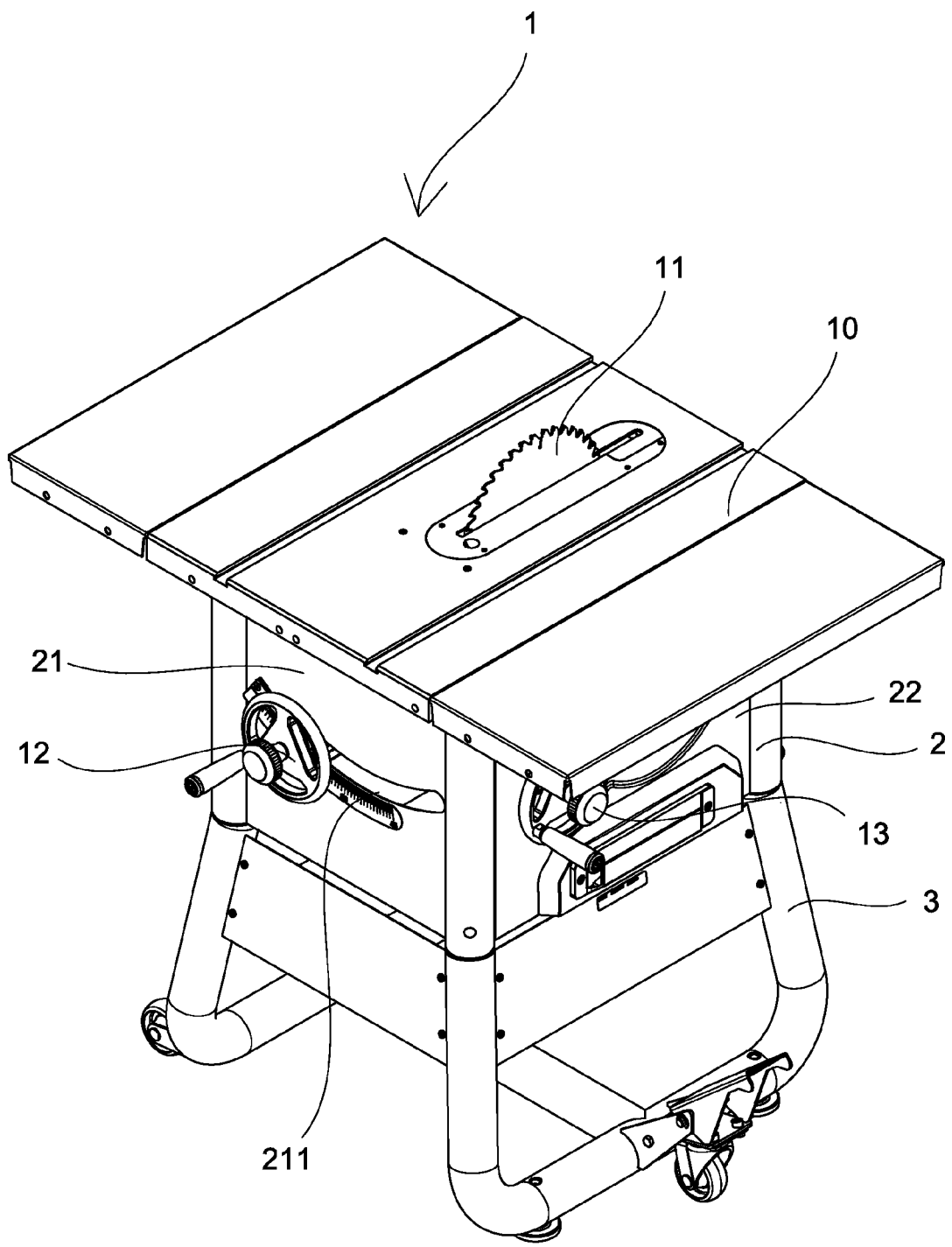
FIG. 1 is a perspective view of a table saw according to the invention.
Figure 2:
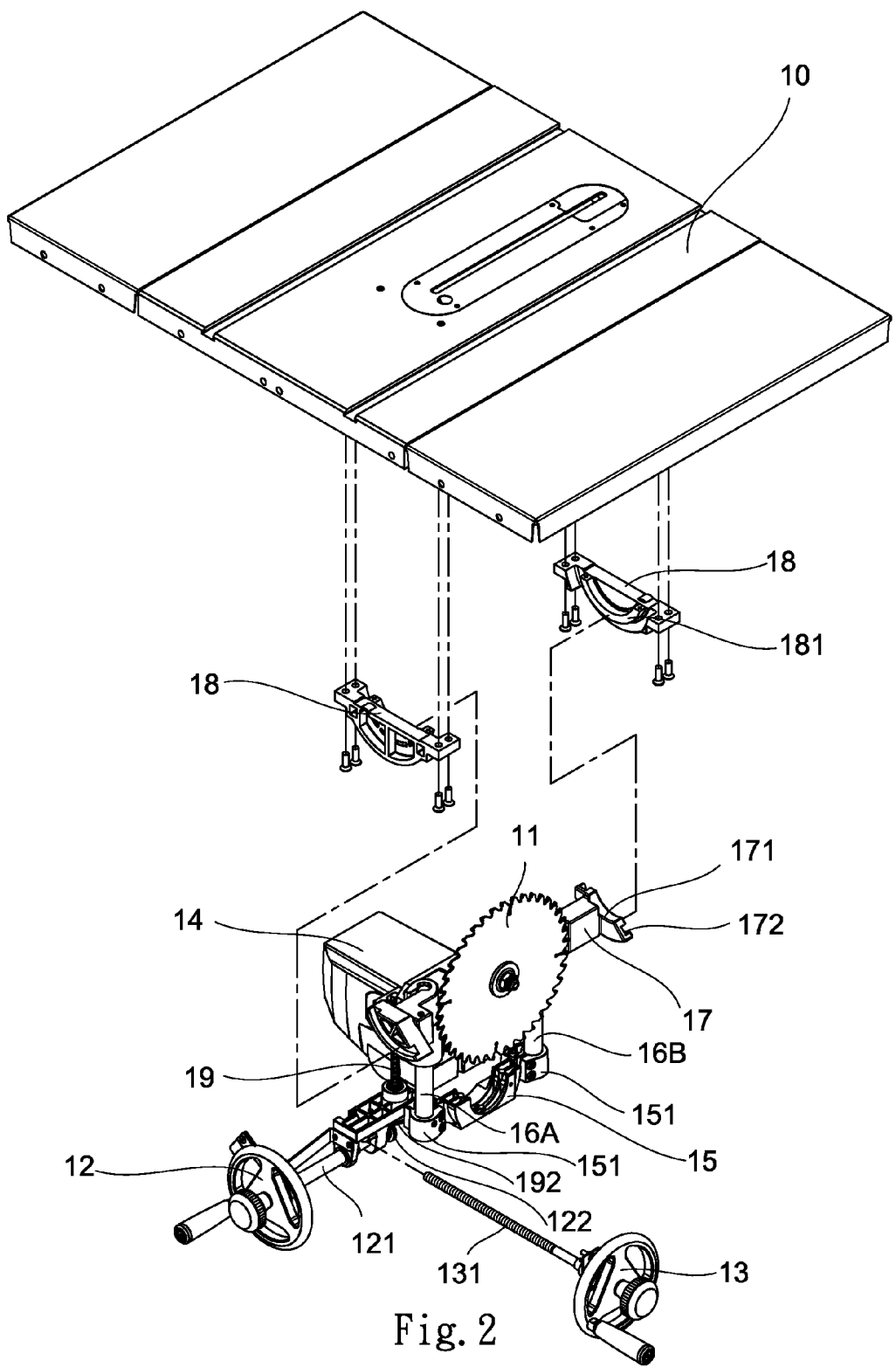
FIG. 2 is an exploded view of an upper portion of the table saw.
Figure 3:
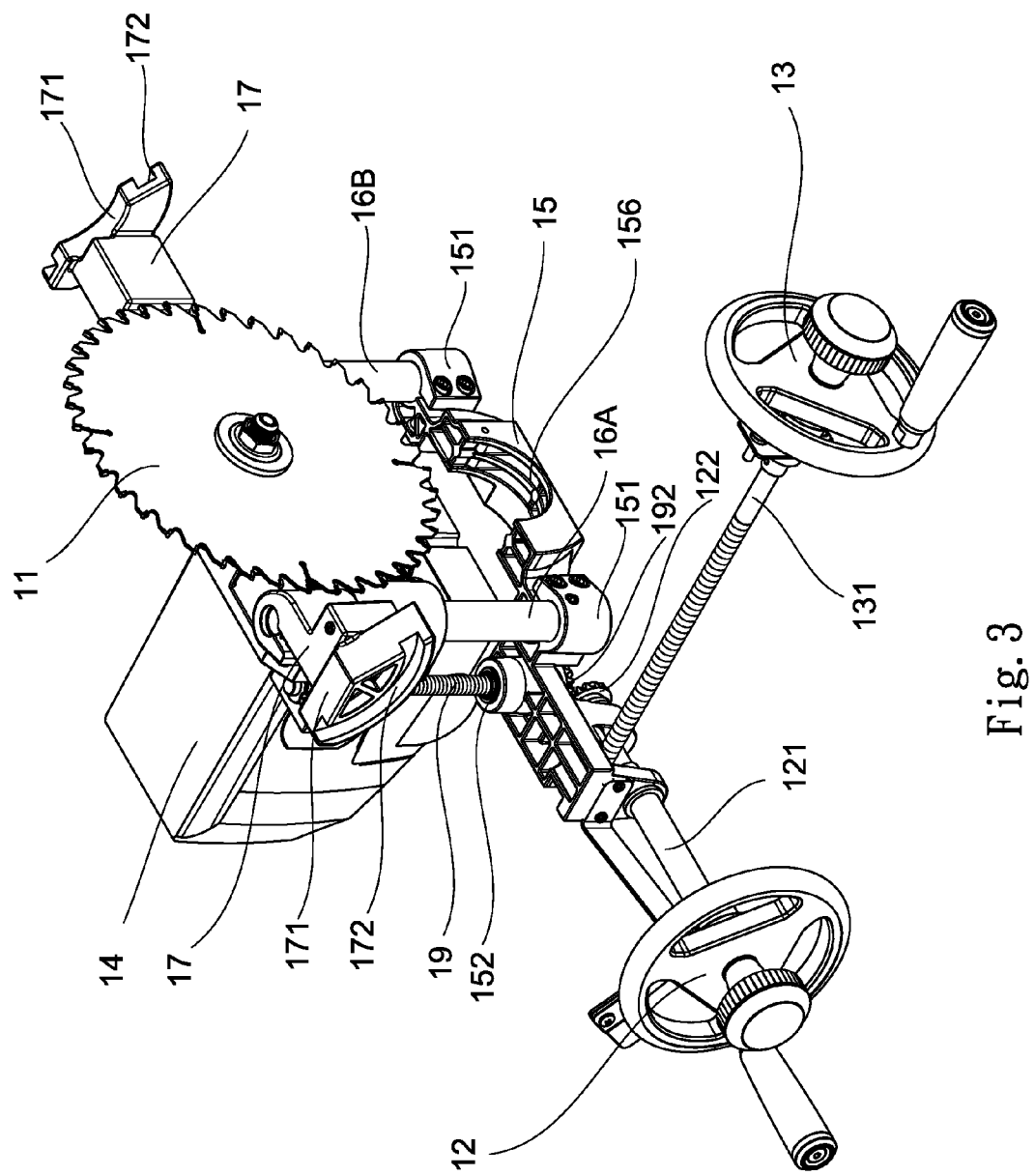
FIG. 3 is a perspective view of the components in a lower part of FIG. 2 being assembled.
Figure 4:
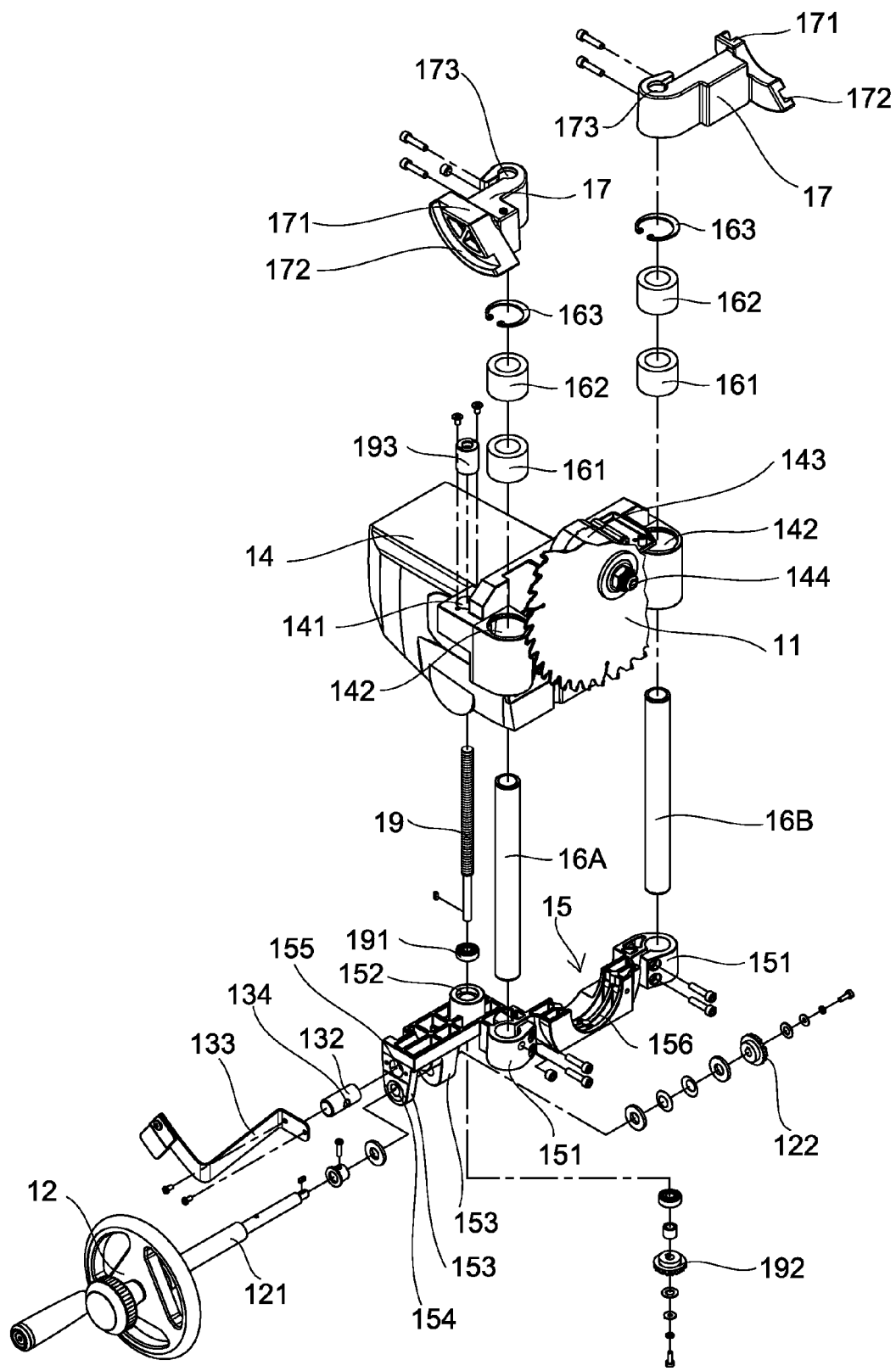
FIG. 4 is an exploded view of FIG. 3 with the bevel adjustment mechanism including drive rod removed.
Figure 5:
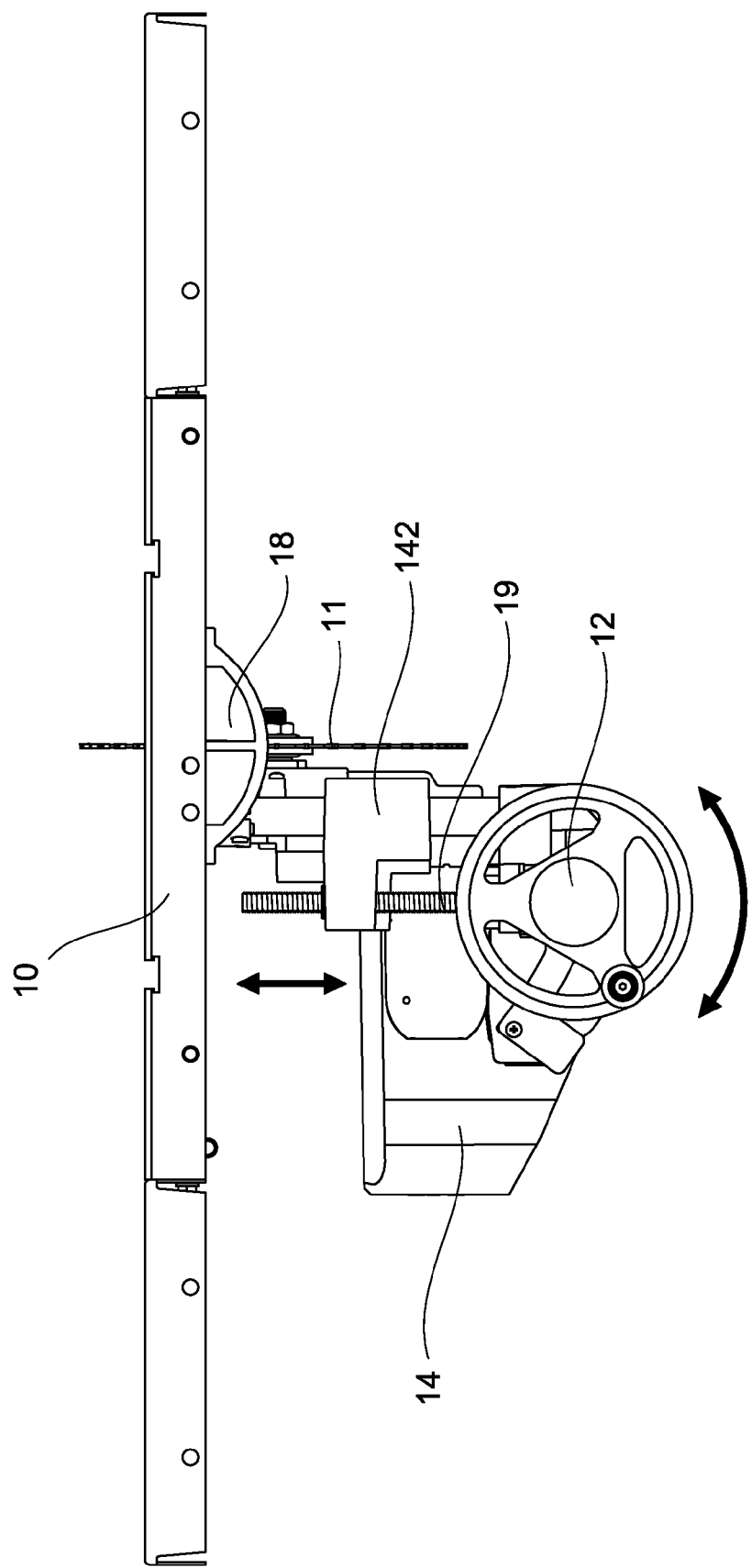
FIG. 5 is a schematic front view of FIG. 1 showing the height adjustment mechanism activated to adjust height of the motor by cooperating with the guide upright and the threaded guiding rod.
Figure 5A:
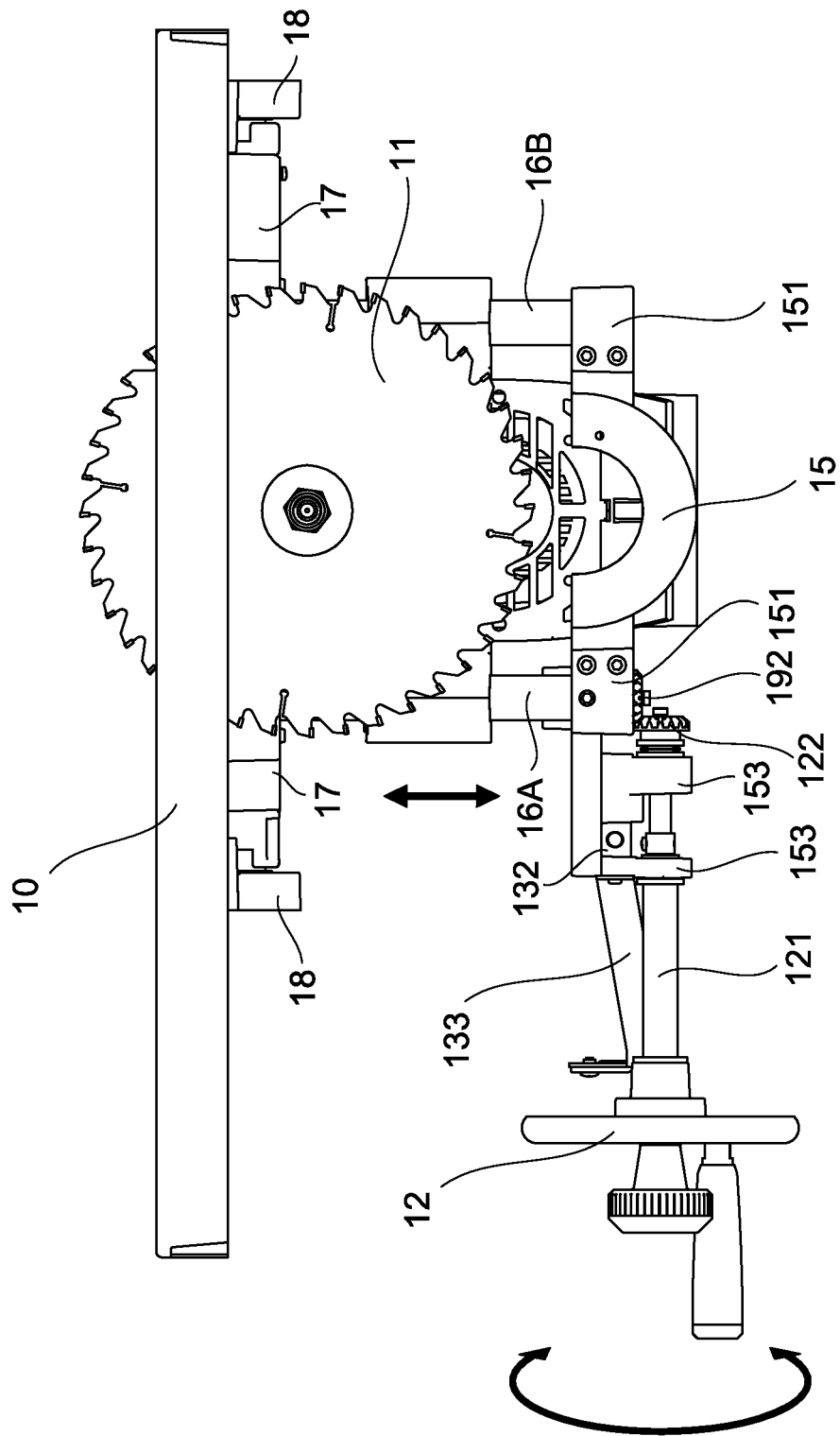
FIG. 5A is a right side of FIG. 5.
Figure 5B:
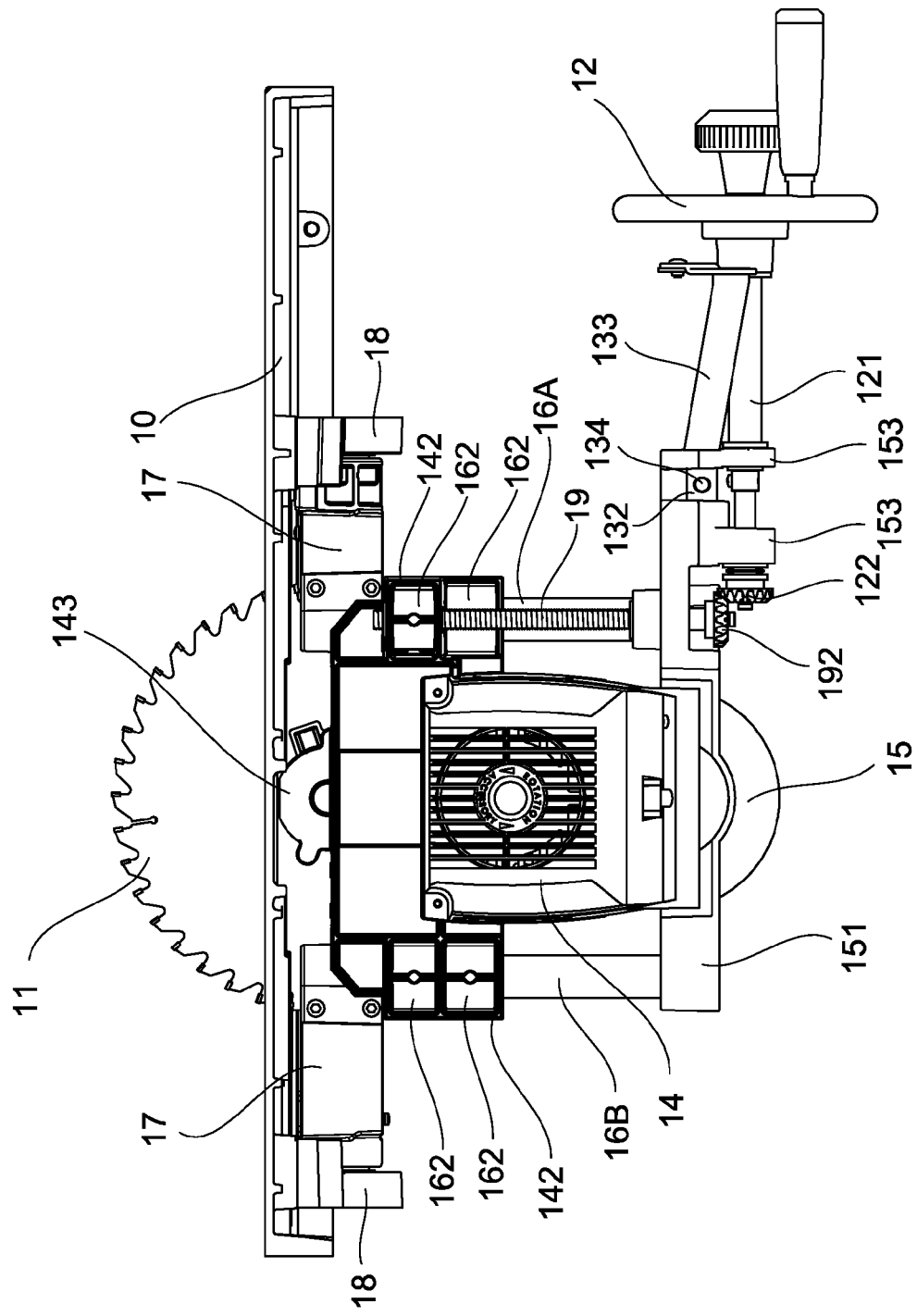
FIG. 5B is a left side view of FIG. 5.

Referring to FIGS. 1 to 5B, a table saw 1 in accordance with the invention is shown. The table saw 1 is mobile and has a weight more than 450 pounds because among other things, one of its components such as motor is an induction motor which is heavy in nature. The table saw 1 is sturdy and comprises the following components as discussed in detail below.

A stand 2, a base 3 mounted under the stand 2, an upper cutting surface 10 mounted on the stand 2, an height adjustment mechanism 12 mounted on a curved slot 211 of a front panel 21 of the stand 2, a bevel adjustment mechanism 13 mounted on a right panel 22, two pivotal support members 18 threadedly secured to a bottom of the upper cutting surface 10, a circular saw blade 11 extending upward from the upper cutting surface 10 to be adapted to cut a substance, e.g., wood, with a depth of 88.9 mm, and a motor (e.g., induction motor) 14 for powering the saw blade 11. The height adjustment mechanism 12 and associated components are the subject of the invention and will be discussed in detail below.

A drive rod 121 is extended from a center of the height adjustment mechanism 12 into the stand 2. A support 15 includes a concave seat 156 directly below the saw blade 11, two aligned first sleeves 151 spaced from both ends of the seat 156 respectively, a guiding hole 152 offset with respect to the seat 156 and aligned with one first sleeve 151, two parallel brackets 153 spaced from the guiding hole 152, two flush first through holes 154 through the brackets 153, and two flush second through holes 155 above the first through holes 154 and through the brackets 153. The drive rod 121 inserts through the first through holes 154 and a first bevel gear 122 is mounted to an open end of the drive rod 12.

A pivot 132 has an internally threaded hole 134 is pivotably disposed in the second through holes 155. A bevel angle indication arm 133 is secured to one bracket 153 and adjacent to one end of the pivot 132. A bevel adjustment mechanism 13 includes an externally threaded drive rod 131 inwardly extending from a center into the internally threaded hole 134. First and second guide uprights 16A, 16B (e.g., sliding rails) each have a lower portion fastened in the first sleeve 151. An externally threaded guide rod 19 has a lower portion inserted through a bearing 191 which is disposed in the guiding hole 152. A second bevel gear 192 is disposed at a bottom end of the guide rod 19 below the guiding hole 152 and meshes with the first bevel gear 122.

The motor 14 includes an internally threaded guide hole 141 threadedly secured to an upper portion of the guide rod 19 which in turn passes through a guide bush 193 mounted on an upper mouth of the guide hole 141. The motor 14 further includes two second sleeves 142 and hollow, upper and lower cylindrical blocks 161, 162 disposed in the second sleeve 142 and put on an intermediate portion of the first guide upright 16A (or second guide upright 16B). The motor 14 further includes two C-rings 163 so that each of the upper and lower cylindrical blocks 161, 162 can be retained in the second sleeve 142 by using the C-ring 163 and are adapted to slide on top of the first guide upright 16A (or second guide upright 16B). Two support elements 17 each include a concave base member 171 at one end, a curved sliding rail 172 slidably disposed on the base member 171, and a fastening member 173 fastened in highest portion of the first guide upright 16A (or second guide upright 16B). Each of the pivotal support members 18 include a sliding block 181 slidably, complementarily secured to the sliding rail 172, thereby pivoting the saw blade 11 an angle with respect to the upper cutting surface 10. Further, the motor 14 is activated to power the saw blade 11 via a gear case 143 and a drive shaft 144 secured to a center of the saw blade 11.

An angular position adjustment of the saw blade 11 is discussed in detail below. A user may rotate the bevel adjustment mechanism 13 to rotate the drive rod 131. And in turn, the pivot 132 pivots to adjust an angular position of the seat 156, the motor 14, and the saw blade 11. It is noted that the upper cutting surface 10 remains stationary due to the sliding arrangement of the sliding blocks 181 and the sliding rails 172.

A height adjustment of the saw blade 11 is discussed in detail below. A user may rotate the height adjustment mechanism 12 to rotate the drive rod 121. And in turn, the guide rod 19 rotates via the transmission of the first and second bevel gears 122, 192. As such, the motor 14 and the saw blade 11 move upward or downward by sliding the second sleeves 142 on the first and second guide uprights 16A, 16B respectively. The gear case 143 on top of the motor 14 may contact a bottom of the upper cutting surface 10. As a result, a cutting depth of the saw blade 11 is adjusted as desired and an elevation of both the motor 14 and the saw blade 11 can be adjusted to prevent an undesired offset.

It is envisaged that the sliding motion of the first and second guide uprights 16A, 16B on the second sleeves 142 can precisely move the motor 14 and the saw blade 11 vertically with respect to the upper cutting surface 10 with additional advantages such as less wear, left and right loads balance, easy assembly, smooth operation, and interchangeability.

It is further envisaged by the invention that advantages including increased structural strength, smooth operation, durability, material saving, increased precision, and improved cutting capability can be obtained.

While the invention has been described in terms of preferred embodiments, those skilled in the art will recognize that the invention can be practiced with modifications within the spirit and scope of the appended claims.

What is claimed is:

1. A height adjustment mechanism of a table saw (1) including a stand (2), an upper cutting surface (10) mounted on the stand (2), a circular saw blade (11) extending upward from the upper cutting surface (10), and a wheeled base (3) mounted under the stand (2), comprising:
    a support (15) including a concave seat (156) under the saw blade (11), two first sleeves (151) spaced from both ends of the seat (156) respectively, a guiding hole (152) offset with respect to the seat (156) and aligned with one of the first sleeves (151), and two parallel brackets (153) spaced from the guiding hole (152);
    a drive rod (121) rotatably extended through the brackets (153);
    a first bevel gear (122) mounted to an open end of the drive rod (121);
    first and second guide uprights (16A, 16B) each having a lower portion fastened in one of the first sleeves (151);
    an externally threaded guide rod (19) having a lower portion inserted through the guiding hole (152);
    a second bevel gear (192) disposed at a bottom end of the guide rod (19) to mesh with the first bevel gear (122);
    a motor (14) including an internally threaded guide hole (141) threadedly secured to the guide rod (19), two second sleeves (142) with the first and second guide uprights (16A, 16B) slidably disposed through respectively; and
    two support elements (17) each including a concave base member (171) at one end, a curved sliding rail (172) slidably disposed on the base member (171) and secured to a bottom of the upper cutting surface (10), and a fastening member (173) fastened on a top of each of the first guide upright (16A) and the second guide upright (16B);
    wherein rotation of the drive rod (121) rotates the guide rod (19) to move both the motor (14) and the saw blade (11) upward or downward by sliding the second sleeves (142) on the first and second guide uprights (16A, 16B) respectively.

2. The height adjustment mechanism of claim 1, wherein the first and second guide uprights (16A, 16B) are sliding rails.

3. The height adjustment mechanism of claim 1, wherein the motor (14) further includes upper and lower cylindrical blocks (161, 162) disposed in each of the second sleeves (142) respectively, each of the upper and lower cylindrical blocks (161, 162) put on an intermediate portion of each of the first guide upright (16A) and the second guide upright (16B), and two C-rings (163) so that each of the upper and lower cylindrical blocks (161, 162) is retained in each of the second sleeves (142) by using one of the C-rings (163) and adapted to slide on a top of each of the first guide upright (16A) and the second guide upright (16B).

4. The height adjustment mechanism of claim 1, further comprising a bevel adjustment mechanism (13) mounted on the stand (2).

5. The height adjustment mechanism of claim 4, wherein the support (15) further includes two flush second through holes (155) above the first through holes (154) and through the brackets (153), and a pivot (132) including an internally threaded hole (134) pivotably disposed in the second through holes (155), and wherein the bevel adjustment mechanism (13) includes an externally threaded drive rod (131) inwardly extending from a center into the internally threaded hole (134) so that a rotation of the drive rod (131) pivots the pivot (132) to adjust an angular position of the seat (156), the motor (14), and the saw blade (11) with respect to the upper cutting surface (10).

6. The height adjustment mechanism of claim 1, further comprising two pivotal support members (18) threadedly secured to a bottom of the upper cutting surface (10), each of the pivotal support members (18) including a sliding block (181) slidably, complementarily secured to the sliding rail (172), thereby pivoting the saw blade (11) an angle with respect to the upper cutting surface (10).

* * * * *